(12) United States Patent
Lee et al.

(10) Patent No.: US 7,709,117 B2
(45) Date of Patent: May 4, 2010

(54) FUEL CELL SYSTEM AND APPARATUS FOR SUPPLYING MIXED FUEL AND WATER TO THE SAME

(75) Inventors: Sung Chul Lee, Yongin (KR); Ju Yong Kim, Seoul (KR); Sang Jun Kong, Yongin (KR); Dong Yun Lee, Yongin (KR); Chan Ho Lee, Yongin (KR); Dong Myung Suh, Yongin (KR); Myeong Ju Ha, Yongin (KR); Dong Uk Lee, Yongin (KR)

(73) Assignee: Samsung SDI Co., Ltd., Suwon-si (LR)

( * ) Notice: Subject to any disclaimer, the term of this patent is extended or adjusted under 35 U.S.C. 154(b) by 179 days.

(21) Appl. No.: 11/501,959

(22) Filed: Aug. 9, 2006

(65) Prior Publication Data

US 2010/0081020 A1    Apr. 1, 2010

(30) Foreign Application Priority Data

Aug. 12, 2005    (KR) .................. 10-2005-0074525

(51) Int. Cl.
*H01M 8/00* (2006.01)
*H01M 8/04* (2006.01)

(52) U.S. Cl. .................. 429/12; 429/17; 429/22; 429/25

(58) Field of Classification Search .................. 429/34, 429/22, 25, 12, 17
See application file for complete search history.

(56) References Cited

U.S. PATENT DOCUMENTS

| | | | |
|---|---|---|---|
| 4,037,024 A | 7/1977 | Landau | |
| 4,362,789 A | 12/1982 | Dighe | |
| 6,015,633 A | 1/2000 | Carlstrom, Jr. et al. | |
| 6,183,895 B1 * | 2/2001 | Kudo et al. | 429/20 |
| 6,740,432 B1 | 5/2004 | Shimanuki et al. | |
| 2003/0189416 A1 | 10/2003 | Scholta et al. | |
| 2005/0077364 A1 | 4/2005 | Hwang | |

FOREIGN PATENT DOCUMENTS

CN    1455966 A    11/2003

(Continued)

OTHER PUBLICATIONS

Chinese patent abstract for publication No. CN 1455966A dated Nov. 12, 2003 in the name of Osamu Tajima et al.

(Continued)

*Primary Examiner*—Patrick Ryan
*Assistant Examiner*—Thomas H. Parsons
(74) *Attorney, Agent, or Firm*—Christie, Parker & Hale, LLP (57) ABSTRACT

An apparatus for supplying mixed fuel includes a water container storing water; a fuel container storing fuel, including at least gaseous fuel, the fuel container being coupled to the water container by a pressure pipe for transferring internal pressure of the fuel container to the water container; and a mixer coupled to the water container through a water supplying pipe and coupled to the fuel container through a fuel supplying pipe, the mixer outputting mixed fuel through a mixed fuel supplying pipe. A water supplying unit includes a water container storing water and connected to a water supplying pipe, the water container having an outlet; and a pressure applying unit coupled to the water container for applying gas pressure to an inside of the water container to discharge water from the water container through the outlet.

40 Claims, 6 Drawing Sheets

FOREIGN PATENT DOCUMENTS

| | | |
|---|---|---|
| CN | 1464581 A | 12/2003 |
| CN | 1606187 A | 4/2005 |
| DE | 101 04 246 C1 | 6/2002 |
| DE | 201 22 157 U1 | 7/2004 |
| DE | 203 20 913 U1 | 6/2005 |
| EP | 1254699 * | 11/2002 |
| JP | 2002-087801 | 3/2002 |
| JP | 2002-201478 | 7/2002 |
| JP | 2003-132920 | 5/2003 |
| JP | 2003-277012 | 10/2003 |
| JP | 2004-319330 | 11/2004 |
| WO | WO 2004/002616 A2 | 1/2004 |
| WO | WO 2004/083036 A1 | 9/2004 |

OTHER PUBLICATIONS

Chinese patent abstract for publication No. CN 1464581A dated Dec. 31, 2003 in the name of Weiguang Wang.

Chinese Office action dated Nov. 23, 2007, for corresponding China Patent application 200610109589.4, with English translation indicating relevance of references in this IDS.

Patent Abstracts of Japan, Publication 2004-319330, Published Nov. 11, 2004, in the name of Tono.

European Search Report dated Dec. 18, 2006, for 06118797.7, in the name of Samsung SDI Co., Ltd.

English translation of claims for DE 201 22 157 U1 listed above.

European Search Report dated Jun. 26, 2007, for EP 06118797.7, in the name of Samsung SDI Co., Ltd.

Patent Gazette dated Mar. 25, 2009 for corresponding Chinese Patent Application No. 200610109589.4 listing the cited reference. US 4,362,789; US 6,015,633; US 2003/0189416 A1; and DE 20122157US were cited in an IDS dated Mar. 16, 2007, CN 1464581 A was cited in an IDS dated Feb. 22, 2008.

Japanese Office action dated Sep. 15, 2009, for corresponding Japanese application 2006-053544, noting listed references in this IDS, as well as JP 2004-319330 previously filed in an IDS dated Aug. 9, 2006.

* cited by examiner

FUEL CELL SYSTEM AND APPARATUS FOR SUPPLYING MIXED FUEL AND WATER TO THE SAME

CROSS-REFERENCE TO RELATED APPLICATIONS

This application claims the benefit of Korean Patent Application No. 10-2005-0074525, filed on Aug. 12, 2005, in the Korean Intellectual Property Office, the entire content of which is incorporated herein by reference.

BACKGROUND

In general, a fuel cell is a power generation system that directly transforms chemical energy due to reaction between hydrogen and oxygen into electrical energy. Here, a fuel cell system can either receive pure hydrogen or hydrogen obtained by reforming methanol, ethanol, natural gas or the like. Also, the fuel cell system can either receive pure oxygen or oxygen contained in air.

A polymer electrolyte membrane fuel cell (PEMFC), which operates at a temperature of 100° C. and below, includes a fuel container to store fuel, a reformer to generate hydrogen by reforming the fuel, and an electricity generator to generate electricity having certain voltage and current by electrochemical reaction between hydrogen and oxygen. The electricity generator includes at least one unit fuel cell to generate the electricity, and may have a structure in which a plurality of unit fuel cells are stacked.

In the PEMFC with this structure, the fuel stored in the fuel container is supplied to the reformer, the reformer generates hydrogen by reforming the fuel, and the electricity generator generates the electricity energy by the electrochemical reaction between hydrogen and oxygen.

The electricity generator substantially includes several to tens of unit fuel cells which are stacked. Here, each unit fuel cell includes a membrane-electrode assembly (MEA) and a bipolar plate. The membrane-electrode assembly includes an electrolyte membrane, and an anode and a cathode attached to opposite sides of the electrolyte membrane. The bipolar plate is used as not only a passage through which hydrogen and oxygen needed for the reaction are supplied, but also a conductor connecting the anode and the cathode of each MEA in series. Through the bipolar plate, hydrogen is supplied to the anode, and oxygen is supplied to the cathode. At this time, hydrogen is oxidized in the anode and oxygen is reduced in the cathode, thereby causing electrons to move and generating electricity.

The reformer applies a reforming reaction to a mixture of fuel and water, thereby not only producing a reformed gas containing rich hydrogen needed for generating electricity in the electricity generator, but also removing carbon monoxide from the reformed gas in order to protect a catalyst of the fuel cell from being poisoned by carbon monoxide. Such a reformer generally includes a reforming unit for reforming the fuel to generate the reformed gas containing rich hydrogen, and a carbon monoxide remover to remove carbon monoxide from the reformed gas. The reforming unit employs a catalytic reaction such as steam reforming (SR), partial oxidation (PDX), auto-thermal reforming (ATR), and the like to get the reformed gas containing rich hydrogen. The carbon monoxide remover employs a catalytic reaction such as water gas shift (WGS), preferential CO oxidation (PROX) and the like, or hydrogen refinement using a separation film in order to remove carbon monoxide from the reformed gas.

Various materials containing hydrogen can be used as the fuel for the PEMFC. Particularly, a hydro-carbonaceous material is generally used. As the hydro-carbonaceous material, butane has recently attracted attention because it is readily available and also employed as a combustion fuel for a heat source needed for the reforming reaction.

Butane has a low boiling point and is easily liquefied at a low pressure, so that it is contained in the fuel container as being liquefied by a predetermined pressure. In the case of the fuel cell system employing butane contained in the fuel container, gasified fuel is discharged of itself from the fuel container to the fuel cell when a nozzle of the fuel container is opened, so that an additional fuel-supplying unit is not needed. However, because other water-supplying unit is still needed to drive the fuel cell, removing only the fuel-supplying unit so as to decrease the volume and the power consumption of the fuel cell system serves little purpose.

SUMMARY

An apparatus for supplying mixed fuel, includes a water container storing water; a fuel container storing fuel, including at least gaseous fuel, the fuel container being coupled to the water container by a pressure pipe for transferring internal pressure of the fuel container to the water container; and a mixer coupled to the water container through a water supplying pipe and coupled to the fuel container through a fuel supplying pipe, the mixer outputting mixed fuel through a mixed fuel supplying pipe.

The fuel may include a hydro-carbonaceous material, such as butane, and the fuel container may be a portable butane fuel container. A distributor may also be mounted at an output end of the fuel container, and may be connected to and may communicate with the pressure pipe and the fuel supplying pipe.

In one embodiment, the pressure pipe is coupled to a first flux control valve, and the fuel supplying pipe is coupled to a second flux control valve. The pressure pipe may be coupled to a first solenoid valve, and the apparatus may further include a power unit and a controller to drive and control the first solenoid valve, respectively. In one embodiment, the fuel supplying pipe is coupled to a second solenoid valve that is driven and controlled by the power unit and the controller, respectively. The water container may include a water level sensor electrically connected with the controller.

In one embodiment, the fuel supplying pipe, the mixed fuel supplying pipe, and the water supplying pipe communicate with one another in a mixing part of the mixer, and the fuel supplying pipe and the mixed fuel supplying pipe have similar inner diameters to each other and are connected to form an aligned hollow pipe. An inner diameter of the water supplying pipe may be narrower than the inner diameters of the fuel supplying pipe and the mixed fuel supplying pipe.

The mixer may include a nozzle provided in the mixing part at one end of the water supplying pipe. The mixer may further include a hollow pipe internally placed in the mixing part and having an inner diameter gradually decreasing from the fuel supplying pipe to the mixed fuel supplying pipe.

Another embodiment of a fuel mixer provided in a fuel cell system using a fluid fuel includes a Venturi pipe, through which the fuel flows, the Venturi pipe having a predetermined discharging pressure therethrough. This embodiment also includes a water supplying pipe having an opening at a location where negative pressure is generated when the fuel flows through the Venturi pipe, the water supplying pipe supplying water through the opening in response to the negative pressure. The opening of the water supplying pipe may be provided with a nozzle, and the nozzle may be oriented at a predetermined angle to a flowing direction of the fuel. A part of the Venturi pipe adjacent to the nozzle may form a curved end oriented toward a center of the Venturi pipe.

In yet another embodiment, an apparatus for supplying mixed fuel includes a water container storing water; a fuel container storing fuel, including at least gaseous fuel; a mixer coupled to and communicating with the fuel container through a fuel supplying pipe, the mixer outputting mixed fuel through a mixed fuel supplying pipe; a Venturi pipe provided in the mixer and allowing a flow of the fuel discharged from the fuel supplying pipe therethrough; and a water supplying pipe coupled between the water container and the mixer, the water supplying pipe having an opening at a location where negative pressure is generated when the fuel flows through the Venturi pipe, the water supplying pipe supplying water through the opening in response to the negative pressure. This embodiment may further include a pressure pipe transferring internal pressure of the fuel container to the water container.

A fuel cell system according to another embodiment includes a water supplying unit to supply water; a fuel container storing fuel, including at least gaseous fuel; a reformer generating hydrogen from mixed fuel of water and the fuel by a chemical catalyst reaction; and an electricity generator generating electricity by transforming electrochemical reaction energy between hydrogen and oxygen into electric energy. The water supplying unit includes a water container storing water and connected with the reformer through a water supplying pipe; and a pressure applying unit applying gas pressure to an inside of the water container to supply water from the water container to the reformer. The pressure applying unit may include a fuel container and a pressure pipe to transfer internal pressure of the fuel container to the water container.

One embodiment of a fuel cell system includes a mixed fuel supplying unit supplying mixed fuel of water and fuel; a reformer generating hydrogen by a chemical catalyst reaction of the mixed fuel; and an electricity generator generating electricity by transforming electrochemical reaction energy between hydrogen and oxygen into electric energy. The mixed fuel supplying unit in this embodiment includes a fuel container storing fuel including at least gaseous fuel; a water container storing water; a mixer connected to and communicating with the fuel container through a fuel supplying pipe, the mixer generating mixed fuel and outputting the mixed fuel through a mixed fuel supplying pipe; a Venturi pipe provided in the mixer and passing the fuel discharged from the fuel supplying pipe therethrough; and a water supplying pipe coupled to the water container and having an opening at a place where negative pressure is generated when the fuel passes through the Venturi pipe, and supplying water through the opening due to the negative pressure. A pressure pipe may also be included for transferring internal pressure of the fuel container to the water container.

A water supplying unit according to one embodiment of the invention includes a water container storing water and connected to a water supplying pipe, the water container having an outlet; and a pressure applying unit coupled to the water container for applying gas pressure to an inside of the water container to discharge water from the water container through the outlet. The pressure applying unit may include a container to store a material including at least gaseous material and a pressure pipe to transfer internal pressure of the container to the water container.

BRIEF DESCRIPTION OF THE DRAWINGS

These and/or other features and aspects of the invention will become apparent and more readily appreciated from the following description of examples of embodiments, taken in conjunction with the accompanying drawings of which.

DETAILED DESCRIPTION

Hereinafter, embodiments of the present invention will be described with reference to accompanying drawings, wherein like numerals refer to like elements.

In embodiments of the fuel cell system described below, fuel denotes a generally available butane fuel, but the invention is not limited thereto. Alternatively, fuel may include a hydro-carbonaceous material such as liquefied natural gas (LNG), propane, pure butane, etc. Pure butane and propane may be mixed, thereby resulting in conventional butane fuel. Hereinafter, a mixture of the butane fuel and water will be called a "mixed fuel".

Figure 1:
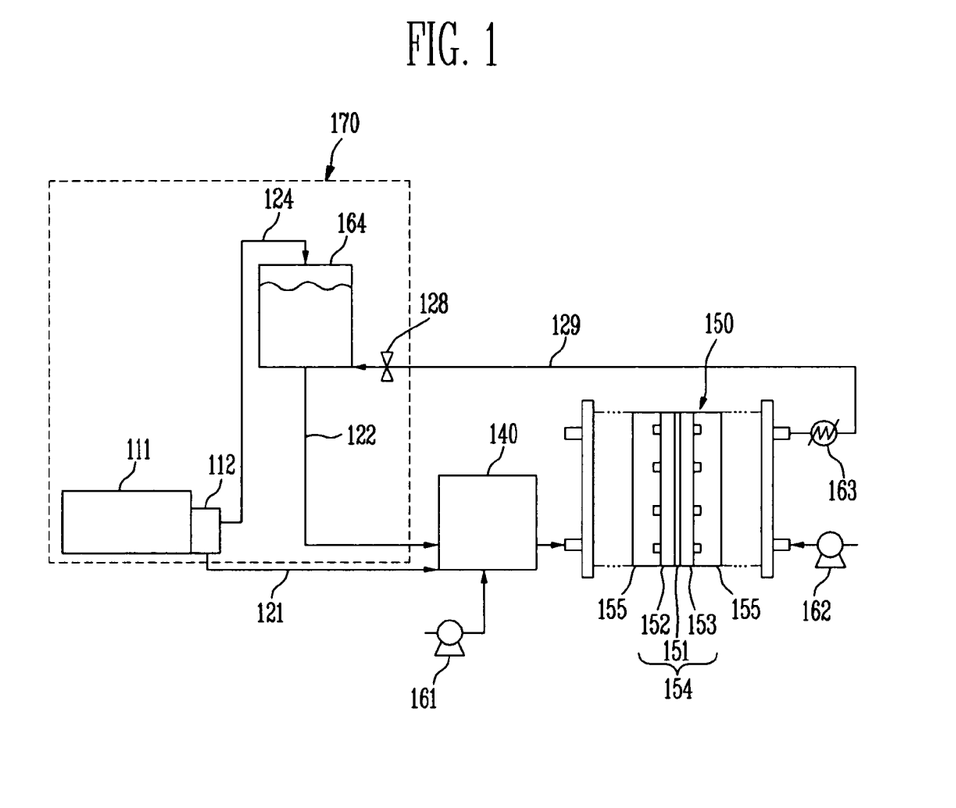
FIG. 1 is a schematic view of a fuel cell system including a water supplying unit according to an embodiment of the present invention.

Referring to FIG. 1, a fuel cell system according to an embodiment of the present invention includes a fuel container 111, a water supplying unit 170 to supply water, a reformer 140 to generate hydrogen from the mixed fuel, an electricity generator 150 to generate electricity by transforming chemical energy based on a reaction between hydrogen and oxygen into electric energy, and air pumps 161 and 162 to supply oxygen to the reformer 140 and the electricity generator 150.

The fuel cell system employs a PEMFC, in which the reformer 140 generates hydrogen gas from the mixed fuel, and the hydrogen gas is supplied to the electricity generator 150, thereby generating the electric energy through electrochemical reaction between hydrogen and oxygen.

The water supplying unit 170 includes the fuel container 111, a distributor 112, a pressure pipe 124, a water container 164, a water supplying pipe 122, and a first check valve 128.

The fuel container 111 is an airtight container resisting pressure and storing the butane fuel therein. Here, the fuel container 111 includes a nozzle (not shown). Further, the fuel container 111 can be implemented by a portable butane fuel container, which is readily available. Hereinafter, the portable butane fuel container will be described as the fuel container 111. In this case, standards of the container are determined on the basis of enforcement regulations of the high-pressure gas safety control law. According to administrative regulations, the container must not deform in a temperature of 50° C. and pressure 1.5 times higher than the gas pressure in the container. Moreover, the container must not rupture in a temperature of 50° C. and pressure 1.8 times higher than the gas pressure in the container. Further, the container must not deform in pressure reaching 1.3 MPa, and it must not rupture in pressure reaching 1.5 MPa. Seamless containers and welded containers are subject to other provisions of the foregoing enforcement regulation.

Butane fuel, as typically sold, is stored in the foregoing portable butane fuel container and is a mixture of about 30% propane and about 70% butane. The reason why propane is mixed with butane is because pure butane boils at −0.5° C. so that it is difficult to gasify butane by itself in winter or in a place having a low temperature. The butane fuel can be easily liquefied at a relatively low pressure and the volume thereof is largely decreased to 1/200 or further when it is liquefied, so that the butane fuel is generally stored in the fuel container 111 in a pressurized and liquefied state.

When the fuel container 111 is filled with the liquefied butane fuel, the liquefied butane fuel is partially gasified so that the internal pressure of the fuel container 111 increases. When the internal pressure reaches a certain pressure, no butane fuel is more gasified, so that the fuel container 111 maintains the certain pressure. At this time, the butane fuel is in vapor-liquid equilibrium and maintained at a vapor pressure or a saturated vapor pressure. Here, the vapor pressure is constant regardless of the amount of liquid contained in the airtight container as long as the liquid has the same components at the same temperature.

Figure 2:
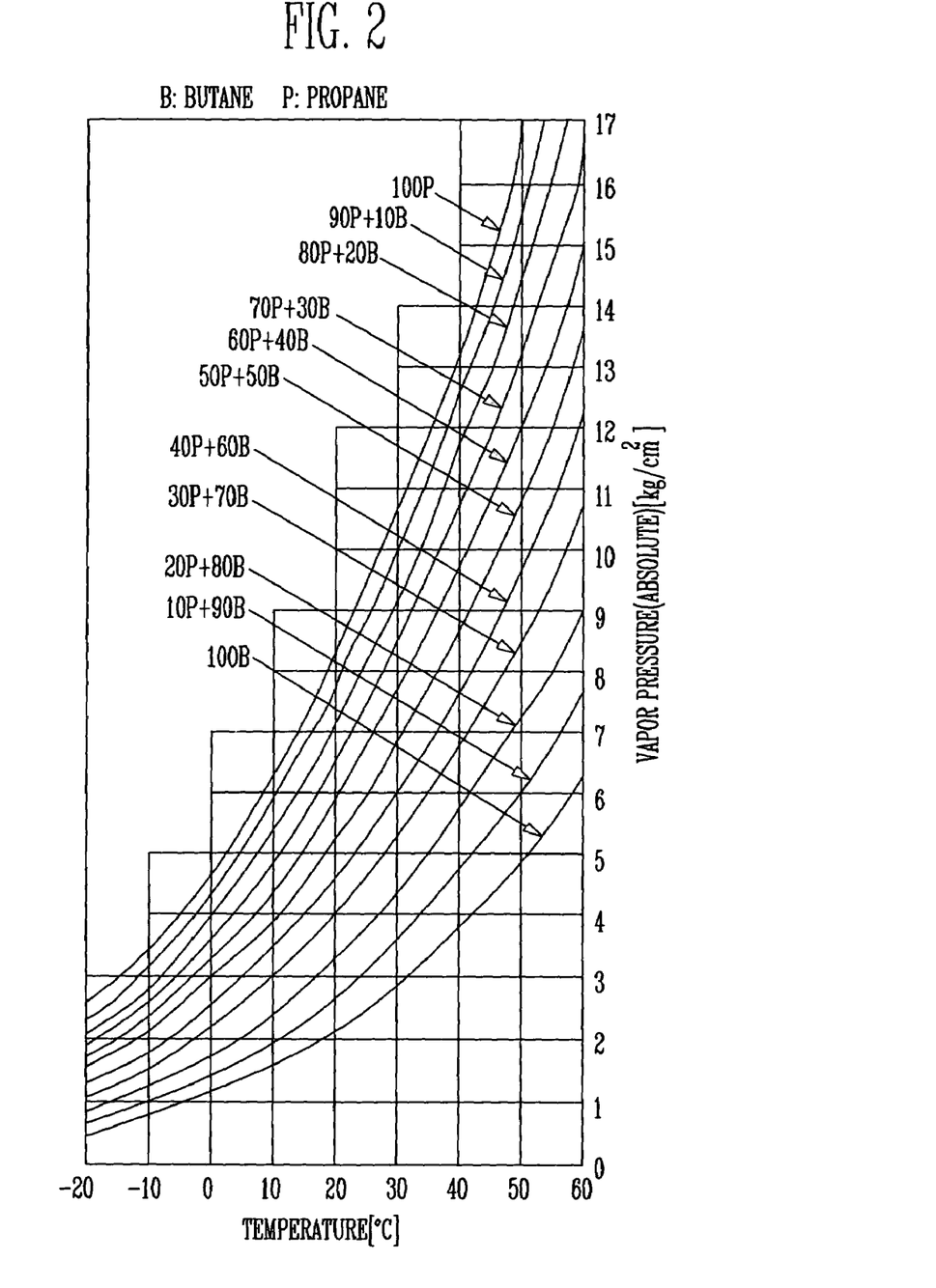
FIG. 2 is a graph showing the relationship between vapor pressure and temperature according to mixtures of propane and butane.

FIG. 2 is a graph showing the relationship between vapor pressure and temperature according to mixtures of propane and butane.

Referring to FIG. 2, for example, the mixed fuel, of which propane and butane are mixed in the ratio of 3 to 7, has a vapor pressure of 4 kg/cm² at a temperature of 20° C. That is, the fuel container 111 maintains its internal pressure to be four times higher than atmospheric pressure at a room temperature of 20° C. Therefore, when the nozzle of the fuel container 111 is opened, the butane fuel filling an upper space of the fuel container 111 is discharged due to the internal pressure. Then, the amount of gas in the upper space decreases, so that the internal pressure is lowered and thus pressure applied to the surface of the liquid is also lowered, thereby gasifying the liquefied butane fuel. Thus, without providing an additional fuel supplying unit, the butane fuel can be continuously supplied as the nozzle of the fuel container 111 is opened.

Referring again to FIG. 1, the butane fuel is distributed by the distributor 112 communicating with the nozzle of the fuel container 111, and discharged of itself without any additional device. The distributor 112 has fuel output ends connected to and communicating with both a first end of the pressure pipe 124 and a fuel supplying pipe 121, respectively. The pressure pipe 124 has a second end connected to and communicating with the inside of the water container 164 in a place and a direction where water stored in the water container 164 does not reverse flow toward the distributor 112 through the pressure pipe 124. The fuel supplying pipe 121 has a second end communicating with the reformer 140. The water supplying pipe 122 has a first end communicating with the inside of the water container 164 in a place and a direction where water stored in the water container 164 can be smoothly supplied.

Further, the water supplying pipe 122 has a second end communicating with the reformer 140. A water recovering pipe 129 communicating with the water container 164 is provided with a first check valve 128. The first check valve 128 allows fluid to flow in only a direction from the water recovering pipe 129 to the water container 164.

With this configuration, the fuel container 111 communicates with the water container 164 through the distributor 112 and the pressure pipe 124. As described above, the fuel container 111 has a predetermined internal pressure, so that some gasified fuel of the fuel container 111 is supplied to the water container 164 and the internal pressure of the water container 164 is increased. Further, the first check valve 128 allows water to be easily introduced to the water container 164 through the water recovering pipe 129, but prevents water from being discharged from the water container 164 through the water recovering pipe 129. Therefore, water stored in the water container 164 is discharged through the water supplying pipe 122 and supplied to the reformer 140. The butane fuel stored in the fuel container 111 is also distributed by the distributor 112 and supplied to the reformer 140 through the fuel supplying pipe 121.

In the foregoing embodiment, the fuel container 111 is used in applying pressure to the inside of the water container 164, but the invention is not limited thereto. Alternatively, a gas filling container may be separately used as long as it can be installed to communicate with the water container 164 and apply gas pressure to the water container 164.

For safety, a domestic butane fuel typically contains slight amounts of odor additives such as tetra hydro thiophene (THT), tertiary butyl mercaptan (TBM) and/or the like. However, such odor additives include sulfur compounds. Therefore, when such a butane fuel is used as a reforming fuel without removing the sulfur compounds, a catalyst is inactivated in the fuel cell system, so that the durability of the fuel cell system is deteriorated. To use the butane fuel for generating reformed gas, sulfur components are first removed from the butane fuel through a desulfurizer (not shown), and then supplied to the reformer 140.

The reformer 140 reforms the mixed fuel of the butane fuel and water through a vapor reforming catalyst reaction so as to generate the reformed gas basically containing hydrogen, and reduces carbon monoxide from the reformed gas through a water gas shift catalyst reaction and a preferential oxidation catalyst reaction. Further, oxygen needed for the preferential oxidation catalyst reaction can be obtained from air supplied by the air pump 161. The reformer 140 can further include a heat source (not shown) to generate heat needed for the catalyst reactions, in which the heat source receives some butane fuel from the fuel container 111 and burns it.

The vapor reforming catalyst reaction, the water gas shift catalyst reaction, and the preferential oxidation catalyst reaction are performed depending on the following reaction formulas 1, 2 and 3, respectively.

[Reaction Formula 1]
Vapor Reforming Catalyst Reaction:

$$n\text{-}C_4H_{10} + 8H_2O \rightarrow 4CO_2 + 13H_2 \quad \Delta H_{298} = 485.3 \text{ KJ/mol}$$

[Reaction Formula 2]
Water Gas Shift Catalyst Reaction:

$$CO + H_2O \rightarrow CO_2 + H_2 \quad \Delta H_{298} = -41.1 \text{ KJ/mol}$$

[Reaction Formula 3]
Preferential Oxidation Catalyst Reaction:

$$CO + \tfrac{1}{2}O_2 \rightarrow CO_2 \quad \Delta H_{298} = -284.1 \text{ KJ/mol}$$

The electricity generator 150 generates electric energy based on electrochemical reaction between hydrogen reformed by the reformer 140 and oxygen supplied through the air pump 162. The electricity generator 150 includes a membrane-electrolyte assembly (MEA) 154 for oxidizing/reducing hydrogen and oxygen, respectively; and a bipolar plate 155 for supplying hydrogen and oxygen to the MEA 154. The MEA 154 generally includes an anode 152, a cathode 153, and an electrolyte membrane 151 interposed between the anode 152 and the cathode 153. The electrochemical reaction of the electricity generator 150 is performed depending on the following reaction formula 4.

[Reaction Formula 4]

Anode: $H_2 \rightarrow 2H+ + 2e-$

Cathode: $\tfrac{1}{2}O_2 + 2H+ + 2e- \rightarrow H_2O$

Total reaction: $H_2 + \tfrac{1}{2}O_2 \rightarrow H_2O + \text{current} + \text{heat}$ The electricity generator 150 has a first end connected with a condenser 163. The condenser 163 condenses water vapor among gas discharged from the electricity generator 150, and then the condensed water is transferred to the water container 164 through the water recovering pipe 129 communicating between the condenser 163 and the water container 164.

Figure 3:
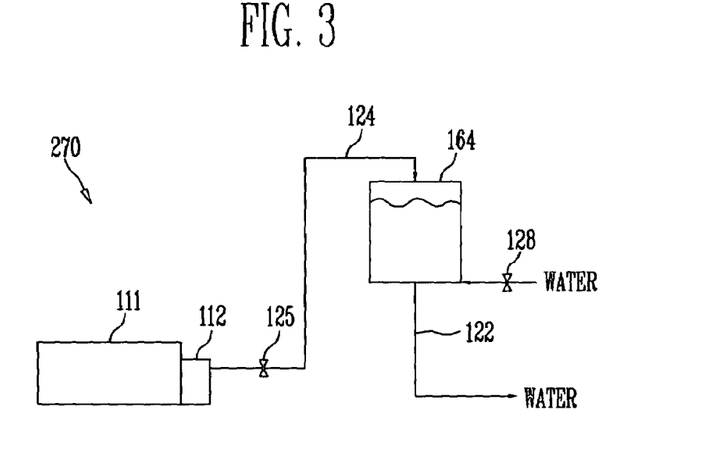
FIG. 3 is a schematic view of a water supplying unit according to another embodiment of the present invention.

FIG. 3 is a schematic view of a water supplying unit according to another embodiment of the present invention.

Referring to FIG. 3, a water supplying unit 270 includes a first flux control valve 125 in addition to the supplying unit 170 as described above. The first flux control valve 125 is installed in the pressure pipe 124.

With this configuration, the first flux control valve 125 is manipulated to adjust the amount of the butane fuel supplied from the fuel container 111 to the water container 164, thereby adjusting the internal pressure of the water container 164 and thus adjusting the amount of water to be discharged from the water container 164 through the water supplying pipe 122.

For convenience, repetitive descriptions about other structures similar to those of the water supplying unit 170 according to the first embodiment will be avoided.

Figure 4:
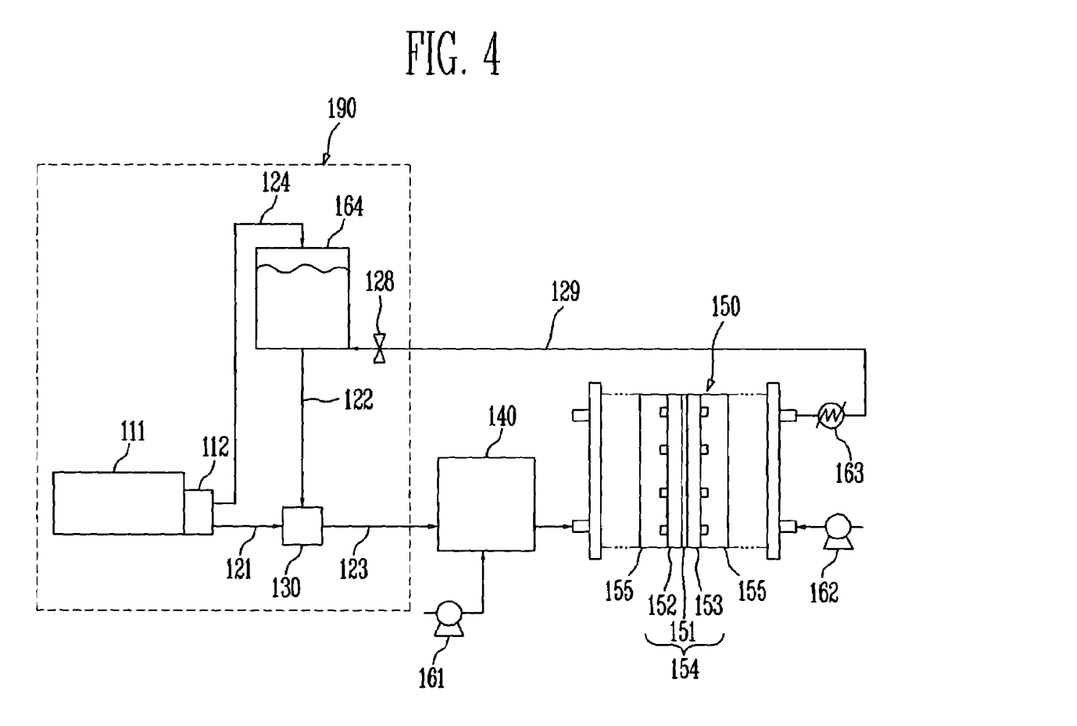
FIG. 4 is a schematic view of a fuel cell including a mixed fuel supplying unit according to an embodiment of the present invention.

Referring to FIG. 4, a fuel cell system according to a third embodiment of the present invention includes a mixed fuel supplying unit 190 to supply mixed fuel; a reformer 140 to reform the mixed fuel to generate hydrogen; an electricity generator 150 to generate electricity by transforming chemical energy based on a reaction between hydrogen and oxygen into electric energy; and air pumps 161 and 162 to supply oxygen to the reformer 140 and the electricity generator 150.

The mixed fuel supplying unit 190 includes the fuel container 111, a distributor 112, a pressure pipe 124, a water container 164, a water supplying pipe 122, a mixer 130, a fuel supplying pipe 121, a mixed fuel supplying pipe 123, and a first check valve 128.

The distributor 112 is connected to and communicating with a nozzle of the fuel container 111. Outputs of the distributor 112 are connected to and communicating with both a first end of the pressure pipe 124 and the fuel supplying pipe 121. The pressure pipe 124 has a second end connected to and communicating with the inside of the water container 164 in a place and a direction where water stored in the water container 164 does not reverse flow toward the distributor 112 through the pressure pipe 124. The fuel supplying pipe 121 has a second end communicating with the inside of the mixer 130. Further, the water supplying pipe 122 has a first end communicating with the inside of the water container 164 in a place and a direction where water stored in the water container 164 can be smoothly supplied. Further, the water supplying pipe 122 has a second end communicating with the inside of the mixer 130. The mixed fuel supplying pipe 123 has a first end communicating with the inside of the mixer 130, and a second end installed in the reformer 140. The first check valve 128 is provided in a water recovering pipe 129 communicating with the water container 164.

With this configuration, the fuel container 111 communicates with the water container 164 through the distributor 112 and the pressure pipe 124. As described above, the fuel container 111 has a predetermined internal pressure, so that some gasified fuel of the fuel container 111 is supplied to the water container 164 and thus increases the internal pressure of the water container 164. Further, the first check valve 128 allows fluid to flow only in one direction, so that water can be easily introduced to the water container 164 through the water recovering pipe 129, but water is prevented from being discharged from the water container 164 through the water recovering pipe 129. Also, the butane fuel stored in the fuel container 111 is distributed by the distributor 112 and then supplied to the mixer 130 through the fuel supplying pipe 121. In the mixer 130, water and the butane fuel are mixed, thereby generating the mixed fuel. Here, the mixed fuel is supplied to the reformer 140 through the mixed fuel supplying pipe 123.

In the foregoing embodiment, the fuel container 111 is used to apply pressure to the inside of the water container 164, but the invention is not limited thereto. Alternatively, a gas filling container may be separately used as long as it can be installed to communicate with the water container 164 and apply gas pressure to the water container 164.

For convenience, repetitive descriptions will be avoided as to the reformer 140, the electricity generator 150 and the air pumps 161 and 162 similar to those of the fuel cell system including the water supplying unit 170 according to the first embodiment.

Figure 5:
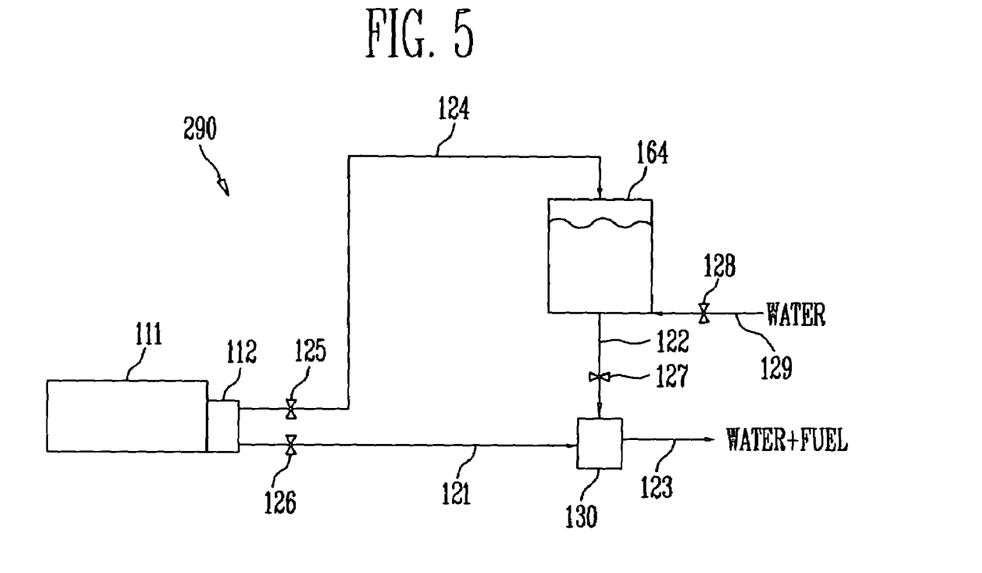
FIG. 5 is a schematic view of a mixed fuel supplying unit according to still another embodiment of the present invention.

Referring to FIG. 5, a mixed fuel supplying unit 290 according to a fourth embodiment includes a first flux control valve 125, a second flux control valve 126, and a second check valve 127 in addition to the mixed fuel supplying unit 190 of the third embodiment. The first flux control valve 125 is connected to a pressure pipe 124; the second flux control valve 126 is connected to a fuel supplying pipe 121; and the second check valve 127 is connected to the water supplying pipe 122.

With this configuration, the amount of butane fuel supplied from the fuel container 111 to the water container 164 is adjusted by manipulating the first flux control valve 125, so that the internal pressure of the water container 164 is adjusted, thereby controlling the amount of water to be discharged from the water container 164 through the water supplying pipe 122. Further, the second flux control valve 126 is manipulated to correspond to the amount of water supplied to the mixer 130, so that the amount of the butane fuel supplied to the mixer 130 is adjusted. Therefore, the first flux control valve 125 and the second flux control valve 126 are properly opened so that a mixing amount and a mixing ratio between water and the butane fuel is easily adjusted in the mixer 130, thereby controlling the output of the fuel cell. Meanwhile, the second check valve 127 allows fluid to flow only in one direction, so that water can be easily discharged from the water container 164 to the mixer 130 through the water supplying pipe 122, but water is prevented from being introduced from the mixer 130 to the water container 164 through the water supplying pipe 122. Therefore, the internal pressure of the mixer 130 is not increased even though the fuel is introduced into the mixer 130, and thus water and the fuel do not reverse flow toward the water container 164.

Figure 6:
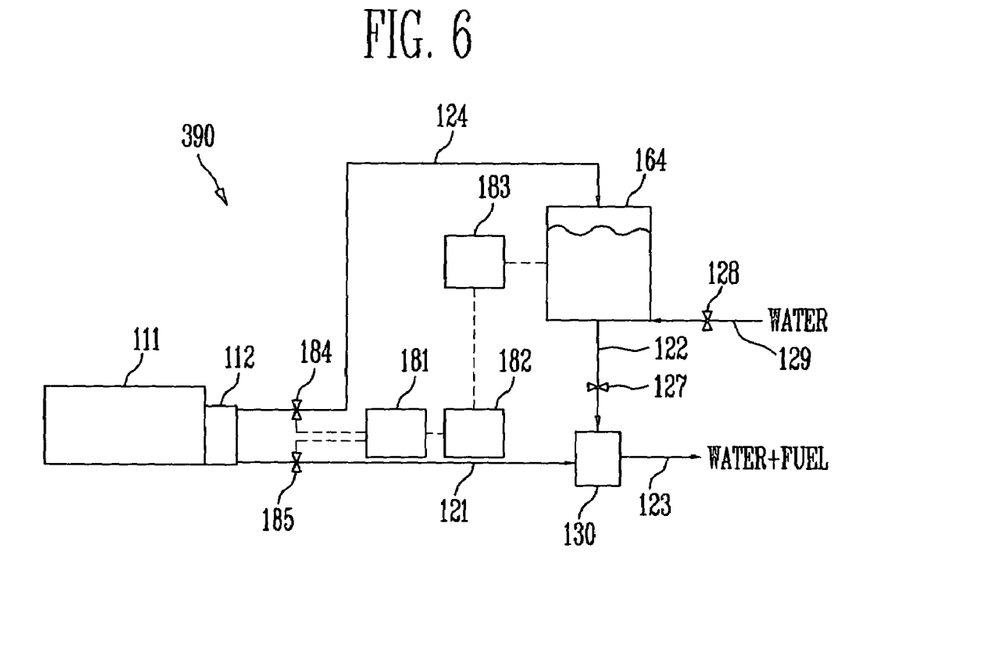
FIG. 6 is a schematic view of a mixed fuel supplying unit according to another embodiment of the present invention.

Referring to FIG. 6, a mixed fuel supplying unit 390 according to a fifth embodiment includes a first solenoid valve 184, a second solenoid valve 185, a power unit 181, a controller 182, a water level sensor 183, and a second check valve 127 in addition to the mixed fuel supplying unit 190 of the third embodiment shown in FIG. 4.

The first solenoid valve 184 is connected to a pressure pipe 124, the second solenoid valve 185 is connected to a fuel supplying pipe 121, and each of the solenoid valves is connected to the power unit 181. The power unit 181 can employ electricity, air pressure, or the like. The power unit 181 is connected to the controller 182, and the controller 182 is connected to the water level sensor 183 installed in the water container 164. Further, the second check valve 127 is connected to the water supplying pipe 122.

With this configuration, the controller 182 drives the power unit 181 by outputting a signal, which may be predetermined, to the power unit 181 as necessary according to a preset value. Then, the opening of the first solenoid valve 184 connected to the power unit 181 is controlled. Therefore, the amount of the butane fuel supplied from the fuel container 111 to the water container 164 is adjusted to control the internal pressure of the water container 164, thereby adjusting the amount of water supplied from the water container 164 to the mixer 130 through the water supplying pipe 122. Further, the controller 182 drives the power unit 181 by outputting a signal, which may be predetermined, to the power unit 181 as necessary according to a preset value, thereby controlling the opening of the second solenoid valve 185. Therefore, the amount of the butane fuel supplied to the mixer 130 is adjusted in correspondence to the amount of water supplied to the mixer 130. Thus, the openings of the first and second solenoid valves 184 and 185 are automatically adjusted by the controller 182, so that the amount of water and the butane fuel supplied to the mixer 130 is adjusted, thereby automatically controlling the mixing amount and the mixing ratio of water and the butane fuel in the mixer 130, and thus controlling the output of the fuel cell.

The water level sensor 183 senses a water level of the water container 164, and outputs a signal, which may be predetermined, for the sensed water level to the controller 182. When the sensed water level is lower than a reference water level, the controller 182 outputs a signal, which may be predetermined, to the power unit 181. Then, the power unit 181 drives the first and second solenoid valves 184 and 185 to operate, so that water and the butane fuel to be supplied to the mixer 130 are gradually decreased and intercepted. Therefore, the fuel cell can be safely stopped. On the other hand, when the sensed water level of the water container 164 is higher than the reference water level as water is separately supplied to the water container 164, the water level sensor 183 senses it and the power unit 181 drives the first and second solenoid valves 184 and 185 to operate. Then, water and the butane fuel are fed again, so that the fuel cell is restarted.

The second check valve 127 allows fluid to flow only in one direction, so that water can be easily discharged from the water container 164 to the mixer 130 through the water supplying pipe 122, but water is prevented from being introduced from the mixer 130 to the water container 164 through the water supplying pipe 122. Therefore, the internal pressure of the mixer 130 is not increased even though the fuel is introduced into the mixer 130, and thus water or the fuel do not reverse flow toward the water container 164.

In the foregoing embodiment, both a first solenoid valve 184 and a second solenoid valve 185 are used, but the invention is not limited thereto. Alternatively, only the first solenoid valve 184 may be used without the second solenoid valve in order to adjust the amount of only water supplied to the mixer 130.

Figure 7:
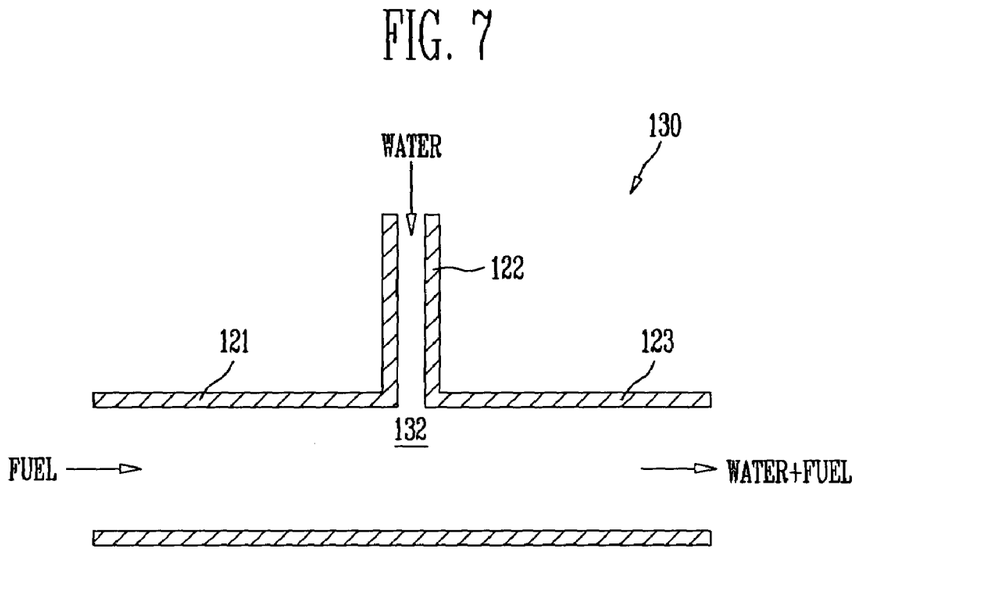
FIG. 7 is a vertical sectional view of a mixer according to an embodiment of the present invention.

FIG. 7 is a vertical sectional view of a mixer according to an embodiment of the present invention.

Referring to FIG. 7, the mixer 130 includes a fuel supplying pipe 121, a water supplying pipe 122, and a mixed fuel supplying pipe 123, which communicate with one another in a mixing part 132. In particular, the fuel supplying pipe 121 and the mixed fuel supplying pipe 123 have similar diameters to each other, and are aligned and communicate with each other. Further, the fuel supplying pipe 121 and the mixed fuel supplying pipe 123 are integrally formed. In FIG. 7, the water supplying pipe 122 is provided perpendicularly to the fuel supplying pipe 121 and the mixed fuel supplying pipe 123, but the invention is not limited thereto. Here, the water supplying pipe 122 for liquid water may have a smaller diameter than those of the fuel supplying pipe 121 and the mixed fuel supplying pipe 123 for gaseous butane fuel.

With this configuration, the gaseous fuel is introduced to the mixing part 132 through the fuel supplying pipe 121, and water is introduced to the mixing part 132 through the water supplying pipe 122 by the pressure of the butane fuel against the water container 164. In the mixing part 132, the fuel and water are mixed as the mixed fuel, and the mixed fuel is transferred through the mixed fuel supplying pipe 123.

Figure 8:
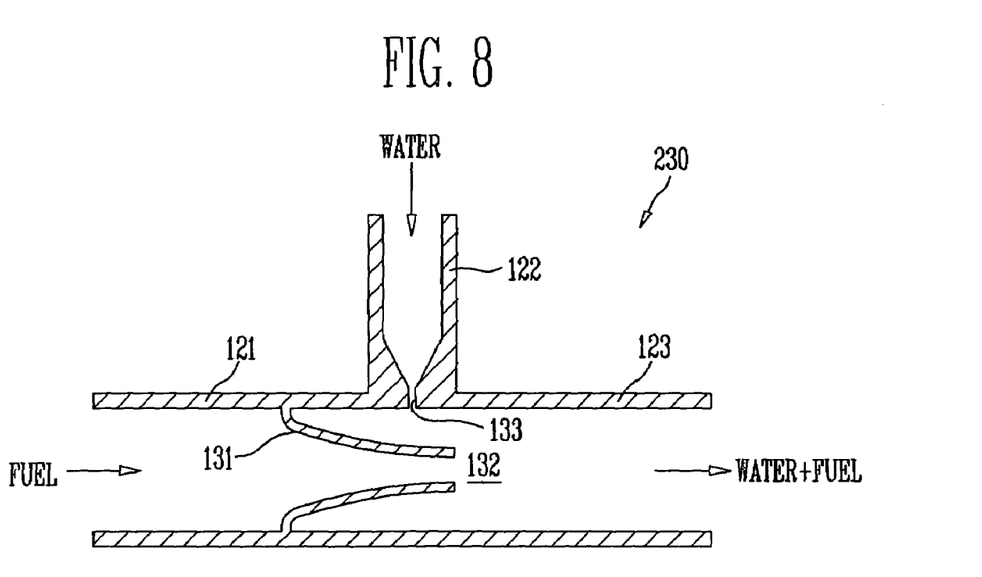
FIG. 8 is a vertical sectional view of a mixer according to another embodiment of the present invention.

FIG. 8 is a vertical sectional view of a mixer according to another embodiment of the present invention.

Referring to FIG. 8, a mixer 230 according to a seventh embodiment of the present invention includes a fuel supplying pipe 121, a water supplying pipe 122, and a mixed fuel supplying pipe 123, which communicate with one another around a mixing part 132. In particular, the fuel supplying pipe 121 and the mixed fuel supplying pipe 123 have similar diameters to each other, and are aligned and communicate with each other. Further, the fuel supplying pipe 121 and the mixed fuel supplying pipe 123 are integrally formed. The water supplying pipe 122 is formed with a spray nozzle 133 at the end thereof connected to and communicating with the mixing part 132. Also, an inner pipe 131 is installed in an inside of the mixing part 132 around a place where the fuel supplying pipe 121 and the mixed fuel supplying pipe 123 are connected to each other, thereby having a double pipe structure. The inner pipe 131 has a first end attached to the inside of the fuel supplying pipe 121 into which the butane fuel is introduced, and a second end extended toward the mixed fuel supplying pipe 123 and having a diameter gradually decreasing. Here, the second end of the inner pipe 131 is adjacent to the spray nozzle 133 of the mixing part 132 and is formed with an opening having a diameter, which may be predetermined.

With this configuration, the gaseous butane fuel is introduced through the fuel supplying pipe 121, and flows along the inner pipe 131 having the gradually diminished diameter toward the mixing part 132. Then, the flux of the butane fuel becomes faster by Bernoulli's theorem, so that the pressure around the mixing part 132 becomes lower, thereby causing negative pressure. Due to the foregoing pressure of the butane fuel against the water container 164 and the negative pressure around the mixing part 132, water is more easily introduced through the water supplying pipe 122, and injected to the mixing part 132 through the spray nozzle 133. In the mixing part 132, the fuel and water are mixed and generated as the mixed fuel, and the mixed fuel is transferred through the mixed fuel supplying pipe 123.

In the foregoing embodiment, the spray nozzle 133 is placed in the outer end of the inner pipe 131, but the invention is not limited thereto. Alternatively, the spray nozzle 133 may be placed in an inner end of the inner pipe 131.

Figure 9:
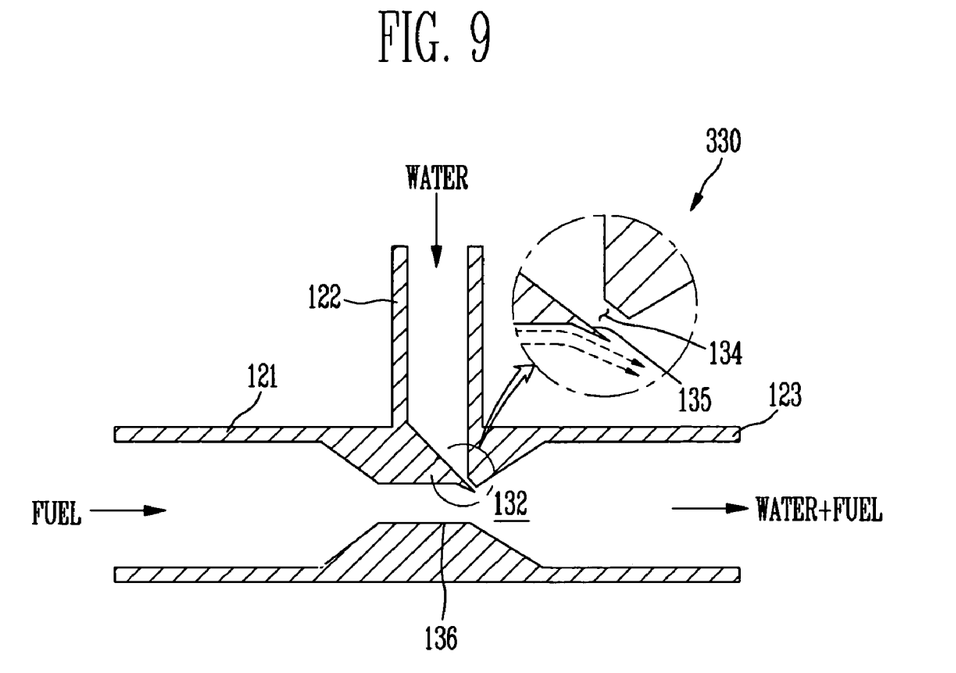
FIG. 9 is a vertical sectional view of a mixer according to still another embodiment of the present invention.

FIG. 9 is a vertical sectional view of a mixer according to still another embodiment of the present invention.

Referring to FIG. 9, a mixer 330 according to an eighth embodiment of the present invention includes a fuel supplying pipe 121, a water supplying pipe 122, and a mixed fuel supplying pipe 123, which communicate with one another in a mixing part 132. In particular, the fuel supplying pipe 121 and the mixed fuel supplying pipe 123 have similar diameters to each other, and are aligned and communicate with each other. Further, a Venturi pipe 136 is provided in an inside of a place where the fuel supplying pipe 121 and the mixed fuel supplying pipe 123 are connected to each other. Like a typical Venturi pipe, the Venturi pipe 136 becomes narrower in the middle thereof, and becomes wider in the opposite ends thereof.

A nozzle 134 is internally formed where the water supplying pipe 122 is connected to and communicates with the mixing part 132. The nozzle 134 is placed in one end of the Venturi pipe 136 facing the mixed fuel supplying pipe 123, at which the diameter of the Venturi pipe 136 starts to become wider. To prevent the fuel flowing in the Venturi pipe 136 from being introduced to the nozzle 134, the nozzle 134 is oriented toward the mixed fuel supplying pipe 123 at a predetermined angle. Thus, the orientation of the Venturi pipe 136 does not counteract the flowing direction of the fuel. Further, a Coanda end 135 is formed where the nozzle 134 meets the Venturi pipe 136. The Coanda end 135 is formed by curving the surface of the Venturi pipe 136 adjacent to the nozzle 134 toward the center of the Venturi pipe 136.

With this configuration, the gaseous butane fuel is introduced through the fuel supplying pipe 121, and flows toward the mixing part 132. While the gaseous butane fuel passes through the Venturi pipe 136 having the gradually diminished diameter, its flux becomes faster. Therefore, the pressure in the mixing part 132 becomes lower by Bernoulli's theorem, thereby causing negative pressure. Meanwhile, the Coanda end 135 is curved downward, so that the butane fuel flowing along the surface of the Coanda end 135 flows downward by the Coanda effect. Also, the butane fuel passing through the Coanda end 135 and flowing around the nozzle 134 continuously flows downward through inertia, thereby minimizing the amount of the butane fuel introduced into the nozzle 134. Therefore, water can be easily sprayed through the nozzle 134 without interruption due to the butane fuel introduced into the nozzle 134.

Due to the foregoing pressure of the butane fuel against the water container 164 and the negative pressure around the mixing part 132, water is more easily introduced through the water supplying pipe 122, and injected to the mixing part 132 through the nozzle 134. In the mixing part 132, the fuel and water are mixed and generated as the mixed fuel, and the mixed fuel is transferred through the mixed fuel supplying pipe 123.

Although various embodiments of the present invention have been shown and described, it would be appreciated by those skilled in the art that changes might be made to these embodiments without departing from the principles and spirit of the invention, the scope of which is defined in the claims and their equivalents.

What is claimed is:

1. An apparatus for supplying mixed fuel, comprising:
   a water container for storing water;
   a fuel container for storing fuel, including at least gaseous fuel, the fuel container being coupled to the water container by a pressure pipe for transferring internal pressure of the fuel container to the water container; and
   a mixer coupled to the water container through a water supplying pipe and coupled to the fuel container through a fuel supplying pipe, the mixer outputting mixed fuel in a mixed fuel flow direction through a mixed fuel supplying pipe and comprising a Venturi pipe between the fuel supplying pipe and the mixed fuel supplying pipe,
   wherein the water supplying pipe is coupled to the mixer via an opening at a location where a diameter of the Venturi pipe starts to become larger and oriented toward the mixed fuel supplying pipe and at an oblique angle to the mixed fuel flow direction.

2. The apparatus according to claim 1, wherein the fuel comprises a hydro-carbonaceous material.

3. The apparatus according to claim 2, wherein the fuel comprises butane.

4. The apparatus according to claim 3, wherein the fuel container is a portable butane fuel container.

5. The apparatus according to claim 1, further comprising a distributor at an output end of the fuel container.

6. The apparatus according to claim 5, wherein the distributor is connected to and communicates with the pressure pipe and the fuel supplying pipe.

7. The apparatus according to claim 1, wherein the pressure pipe is coupled to a first flux control valve.

8. The apparatus according to claim 7, wherein the fuel supplying pipe is coupled to a second flux control valve.

9. The apparatus according to claim 1,
   wherein the pressure pipe is coupled to a first solenoid valve, and
   wherein the apparatus further comprises a power unit and a controller to drive and control the first solenoid valve, respectively.

10. The apparatus according to claim 9, wherein the fuel supplying pipe is coupled to a second solenoid valve that is driven and controlled by the power unit and the controller, respectively.

11. The apparatus according to claim 10, wherein the water container comprises a water level sensor electrically connected with the controller.

12. The apparatus according to claim 1, wherein the fuel supplying pipe, the mixed fuel supplying pipe, and the water supplying pipe communicate with one another in a mixing part of the mixer, and
   the fuel supplying pipe and the mixed fuel supplying pipe have similar inner diameters to each other and are connected to form an aligned hollow pipe.

13. The apparatus according to claim 12, wherein an inner diameter of the water supplying pipe is narrower than the inner diameters of the fuel supplying pipe and the mixed fuel supplying pipe.

14. The apparatus according to claim 12, wherein the mixer comprises a nozzle provided in the mixing part at one end of the water supplying pipe.

15. A fuel mixer provided in a fuel cell system using a fluid fuel, the fuel mixer comprising:
   a Venturi pipe, through which the fuel flows, the Venturi pipe having a discharging pressure therethrough; and
   a water supplying pipe having an opening and being in communication with the Venturi pipe via the opening at a downstream end of the Venturi pipe where negative pressure is generated when the fuel flows through the Venturi pipe, the water supplying pipe supplying water through the opening in response to the negative pressure, wherein the opening of the water supplying pipe includes a nozzle oriented at an oblique angle to a mixed fuel flow direction.

16. The fuel mixer according to claim 15, wherein a part of the Venturi pipe adjacent to the nozzle curves toward a center axis of the Venturi pipe.

17. The fuel mixer according to claim 15, wherein the nozzle has a smaller inner diameter than an inner diameter of the water supplying pipe.

18. An apparatus for supplying mixed fuel, comprising:
a water container for storing water;
a fuel container for storing fuel, including at least gaseous fuel;
a mixer coupled to and communicating with the fuel container through a fuel supplying pipe, the mixer outputting mixed fuel in a mixed fuel flow direction through a mixed fuel supplying pipe;
a Venturi pipe provided in the mixer and allowing a flow of the fuel discharged from the fuel supplying pipe therethrough; and
a water supplying pipe coupled between the water container and the mixer, the water supplying pipe having an opening at a location where negative pressure is generated when the fuel flows through the Venturi pipe, the water supplying pipe supplying water through the opening in response to the negative pressure,
wherein the water supplying pipe is in communication with the mixer via the opening, the opening being at a location where a diameter of the Venturi pipe starts to become larger and oriented toward the mixed fuel supplying pipe at an oblique angle to the mixed fuel flow direction.

19. The apparatus according to claim 18, further comprising a pressure pipe transferring internal pressure of the fuel container to the water container.

20. The apparatus according to claim 19, wherein the fuel comprises a hydro-carbonaceous material.

21. The apparatus according to claim 20, wherein the fuel comprises butane.

22. The apparatus according to claim 21, wherein the fuel container is a portable butane fuel container.

23. The apparatus according to claim 19, further comprising a distributor mounted at an output end of the fuel container.

24. The apparatus according to claim 23, wherein the distributor is connected to and communicates with the pressure pipe and the fuel supplying pipe.

25. The apparatus according to claim 19, wherein the pressure pipe is coupled to a first flux control valve.

26. The apparatus according to claim 25, wherein the fuel supplying pipe is coupled to a second flux control valve.

27. The apparatus according to claim 19, wherein the pressure pipe is coupled to a first solenoid valve, and wherein the apparatus further comprises a power unit and a controller to drive and control the first solenoid valve, respectively.

28. The apparatus according to claim 27, wherein the fuel supplying pipe is coupled to a second solenoid valve that is driven and controlled by the power unit and the controller, respectively.

29. The apparatus according to claim 28, wherein the water container comprises a water level sensor electrically connected with the controller.

30. The apparatus according to claim 18, wherein the opening of the water supplying pipe is provided with a nozzle.

31. The apparatus according to claim 30, wherein the nozzle is oriented at the oblique angle to the mixed fuel flow direction.

32. The apparatus according to claim 31, wherein a part of the Venturi pipe adjacent to the nozzle curves toward a center axis of the Venturi pipe.

33. A fuel cell system comprising:
a mixed fuel supplying unit supplying mixed fuel of water and fuel;
a reformer generating hydrogen by a chemical catalyst reaction of the mixed fuel; and
an electricity generator generating electricity by transforming electrochemical reaction energy between the hydrogen and oxygen into electric energy,
wherein the mixed fuel supplying unit comprises:
a fuel container for storing fuel including at least gaseous fuel;
a water container for storing water;
a mixer connected to and communicating with the fuel container through a fuel supplying pipe, the mixer generating the mixed fuel and outputting the mixed fuel in a mixed fuel flow direction through a mixed fuel supplying pipe;
a Venturi pipe provided in the mixer and passing the fuel from the fuel supplying pipe therethrough; and
a water supplying pipe coupled to the water container and having an opening at a place where negative pressure is generated when the fuel passes through the Venturi pipe, and supplying water through the opening due to the negative pressure,
wherein the water supplying pipe is in communication with the mixer via a nozzle at a location where a diameter of the Venturi pipe starts to become larger, the nozzle having an inner surface at an oblique angle to the mixed fuel flow direction.

34. The fuel cell system according to claim 33, further comprising a pressure pipe transferring internal pressure of the fuel container to the water container.

35. The fuel cell system according to claim 34, wherein the fuel comprises a hydro-carbonaceous material.

36. The fuel cell system according to claim 35, wherein the fuel comprises butane.

37. The apparatus according to claim 36, wherein the fuel container is a portable butane fuel container.

38. The fuel cell system according to claim 33, wherein a portion of the Venturi pipe adjacent the nozzle is curved toward a center axis of the Venturi pipe, the portion having a surface substantially parallel to the inner surface of the nozzle.

39. An apparatus for supplying mixed fuel, comprising:
a water container for storing water;
a fuel container for storing fuel, including at least gaseous fuel, the fuel container being coupled to the water container by a pressure pipe for transferring internal pressure of the fuel container to the water container; and
a mixer coupled to the water container through a water supplying pipe and coupled to the fuel container through a fuel supplying pipe, the mixer configured to output mixed fuel through a mixed fuel supplying pipe in a mixed fuel flow direction,
wherein the fuel supplying pipe, the mixed fuel supplying pipe, and the water supplying pipe communicate with one another in a mixing part of the mixer, the mixing part within an outer wall of the mixer,
wherein the mixer includes a hollow pipe within the outer wall of the mixer, the hollow pipe having a first end proximate the fuel supplying pipe and coupled to an inner surface of the outer wall of the mixer, and the hollow pipe having an outer diameter and an inner diameter, the outer and inner diameters gradually decreasing from the first end to a second end of the hollow pipe proximate the mixed fuel supplying pipe, the water supplying pipe in communication with the mixing part via a nozzle opening through the outer wall of the mixer between the first and second ends of the hollow pipe such that water from the water supplying pipe flows between the outer diameter of the hollow pipe and the inner surface of the outer wall of the mixer within the mixing part.

40. The apparatus according to claim 39, wherein the nozzle opening is through the outer wall of the mixer in a direction that is substantially perpendicular to the mixed fuel flow direction.

\* \* \* \* \*

UNITED STATES PATENT AND TRADEMARK OFFICE
CERTIFICATE OF CORRECTION

PATENT NO. : 7,709,117 B2
APPLICATION NO. : 11/501959
DATED : May 4, 2010
INVENTOR(S) : Sung Chul Lee et al.

It is certified that error appears in the above-identified patent and that said Letters Patent is hereby corrected as shown below:

PATENT

On the Title Page

(73) Assignee      Delete "Suwon-si (LR)"
                          Insert -- Suwon-si (KR) --

Signed and Sealed this
Seventeenth Day of January, 2012

David J. Kappos
*Director of the United States Patent and Trademark Office*